United States Patent [19]

Kondo

[11] 4,411,507
[45] Oct. 25, 1983

[54] POSITION CONTROL DEVICE FOR MOVABLE MEMBER

[75] Inventor: Takashi Kondo, Izumi, Japan

[73] Assignee: Minolta Camera Kabushiki Kaisha, Osaka, Japan

[21] Appl. No.: 398,950

[22] Filed: Jul. 16, 1982

[30] Foreign Application Priority Data

Jul. 28, 1981 [JP] Japan ............................ 56-118797

[51] Int. Cl.³ .......................... G03B 3/10; G03B 9/02; G03B 5/01
[52] U.S. Cl. .................................... 354/195; 354/25; 354/271; 318/611
[58] Field of Search ............... 354/25 R, 25 A, 25 N, 354/25 P, 195, 271; 318/611, 636; 352/140

[56] References Cited

U.S. PATENT DOCUMENTS

| | | | |
|---|---|---|---|
| 3,893,140 | 7/1975 | Yata et al. | 354/50 |
| 4,129,877 | 12/1978 | Yamamichi et al. | 354/271 |
| 4,199,235 | 4/1980 | Matsuda et al. | 354/25 |
| 4,251,144 | 2/1981 | Matsuda et al. | 354/25 |
| 4,327,979 | 5/1982 | Tominaga et al. | 354/105 |

*Primary Examiner*—William B. Perkey

*Attorney, Agent, or Firm*—Watson, Cole, Grindle & Watson

[57] ABSTRACT

A position control device for controlling a position of a movable member has high durability and is free from a hunting phenomenon. Electric contacts arranged in a row at a given pitch are respectively connected to the nodes between series-connected resistors and first and second brushes interlocked with the movable member can contact the adjoining two of the electric contacts at a time such that discrete two voltage signals are generated at the first and second brushes. A pair of comparators compare these voltage signals with a voltage signal corresponding to a target position where the movable member is to be stopped and a driving means for the movable member stops its operation when the former voltage signals sandwitch the latter voltage signal. A third brush capable of contacting index terminals in response to the movement of the movable member and a pair of memorizing means capable of memorizing the outputs of the comparators each time the third brush contacts one of the index terminals are provided for minimizing the error in the position where the movable member is actually stopped.

8 Claims, 4 Drawing Figures

POSITION CONTROL DEVICE FOR MOVABLE MEMBER

BACKGROUND OF THE INVENTION

1. Field of the Invention

The present invention relates to a movable member control device for stopping a movable member at a position corresponding to an analog signal.

2. Description of the Prior Art

In order to move a movable member and stop it at a position corresponding to an analog signal, it is necessary that the instantaneous position of the movable member is converted to a signal that can be compared with the analog signal. A conventional device for this purpose includes a slider contact slidable on a resistor band or strip in a linked relationship with the movable member whereupon a signal representative of the position of the movable member is derived through the slider contact. However, such a conventional device is subject to the following disadvantages. As the slider contact is adapted to slide on a resistor strip, the latter is subject to wear which changes the resistance and accordingly the relationship between the position of the movable member and the output from the slider contact. In short, the conventional device has poor durability. Additionally, if a servomechanism is employed to continuously drive the movable member, a target position signal representing a target position at which the movable member is to be stopped is compared with a continuously changing signal derived from the slider contact whereby hunting is likely to occur, wherein the movable member oscillates about the target position.

SUMMARY OF THE INVENTION

An object of the present invention is to provide a position control device for a movable member which device is free from the above-mentioned disadvantages of the conventional device, in particular the occurrence of hunting.

Another object of the present invention is to provide a position control device for a movable member which device has good durability.

To attain those objects, the present invention adopted the following construction:

(1) The device of the invention is provided with a means for converting the position of a movable member into two analog signals having different values from each other and a means for comparing those two analog signals with a target position signal corresponding to a target position where the movable member is to be stopped. The device drives the movable member until the above two signals sandwich the target position signal therebetween, thereby eliminating the hunting discussed above.

(2) To obtain the above-mentioned two analog signals relating to the position of the movable member, voltages of different values (or measures) are supplied to respective fixed contacts arranged in a row and a pair of movable contacts separated by a given distance in the direction of the row slidably move along the fixed contacts in a linked relationship with the movable member. The distance between the movable contacts is selected so that they may engage adjoining fixed contacts. With this arrangement, two analog signals different from each other are obtained depending upon the position of the movable contacts. The voltage signals obtained through the movable contacts will not change even if the fixed contacts are worn out by sliding contact with the movable contacts, whereby the durability of the device is improved.

The above and other objects and advantages of the present invention will become more apparent from the following description of a preferred embodiment of the present invention taken in conjunction with the accompanying drawings.

DESCRIPTION OF PREFERRED EMBODIMENT

In the embodiment that will be described hereinafter, the present invention applies to an objective lens driving device for a camera automatic focusing device. A signal derived from a range finding device or a camera-to-object distance measuring device serves as the target or stop position signal which represents the position where the movable member is stopped. The objective lens is driven with the stop signal being compared with electric signals corresponding to the position of the objective lens.

Figure 1:
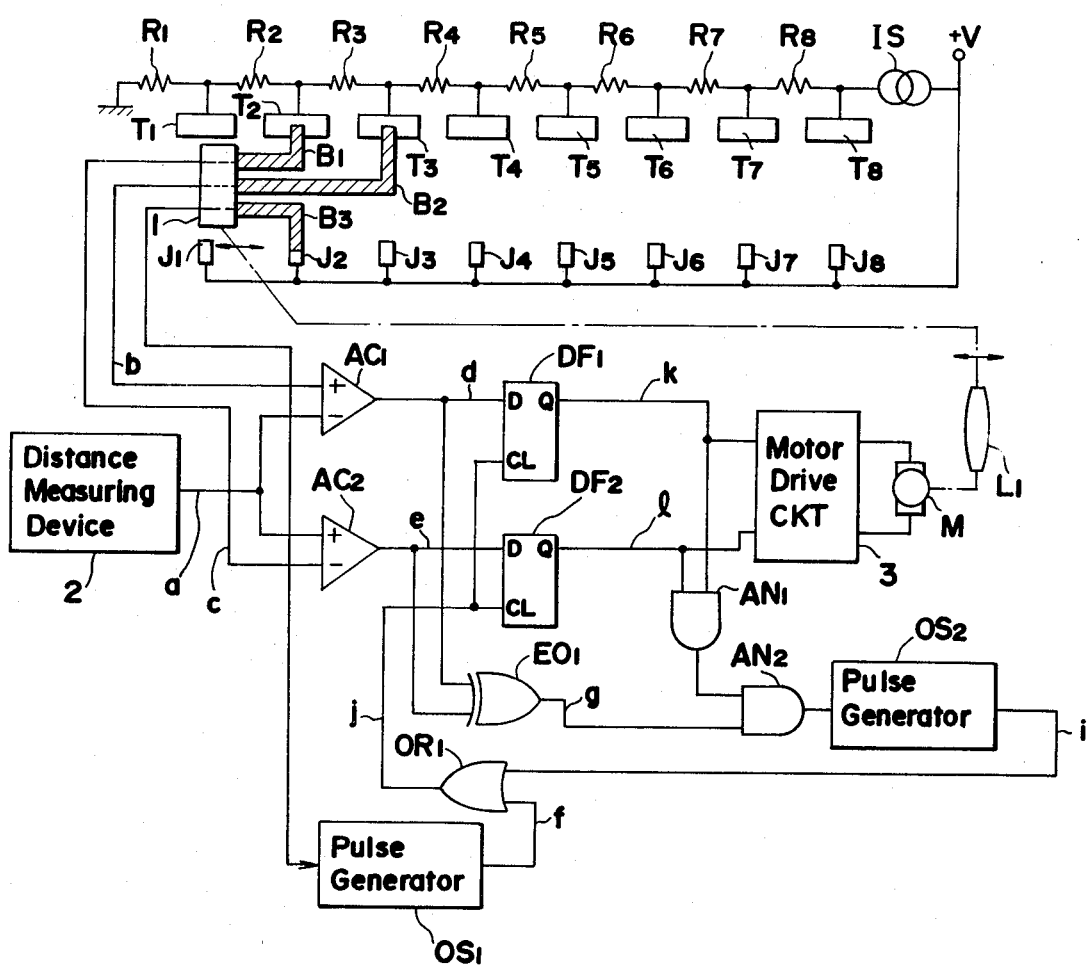
FIG. 1 is a schematic illustration of an embodiment of the invention applied to an objective lens driving device for a camera automatic focusing device.

With reference to FIG. 1, movable contacts B1 and B2 slidingly move along the row of fixed contacts T1 and T8 which correspond to discrete positions of the objective lens. The movable contacts B1 and B2 are arranged to engage the adjoining pair of fixed contacts so that from the movable contacts two signals are obtained corresponding to the two adjoining positions of the discrete positions of the objective lens. Those two signals are respectively compared with the output of distance measuring device 2 by comparator AC1 and AC2. As will be described below, both outputs of comparators AC1 and AC2 have "High" levels to stop objective lens driving motor M when the output of distance measuring device 2 has a value between the values of the voltages derived from the two adjoining fixed contacts, e.g. T2 and T3 in FIG. 1.

A more detailed description will now be given with respect to the embodiment of FIG. 1. Movable member 1 is provided with brushes B1, B2 and B3 and is linked with driving motor M through an objective lens 1 driven by the motor. Distance measuring device 2 generates a distance signal in the form of an analog signal. An exemplary arrangement of the distance measuring device is shown in FIG. 2.

Figure 2:
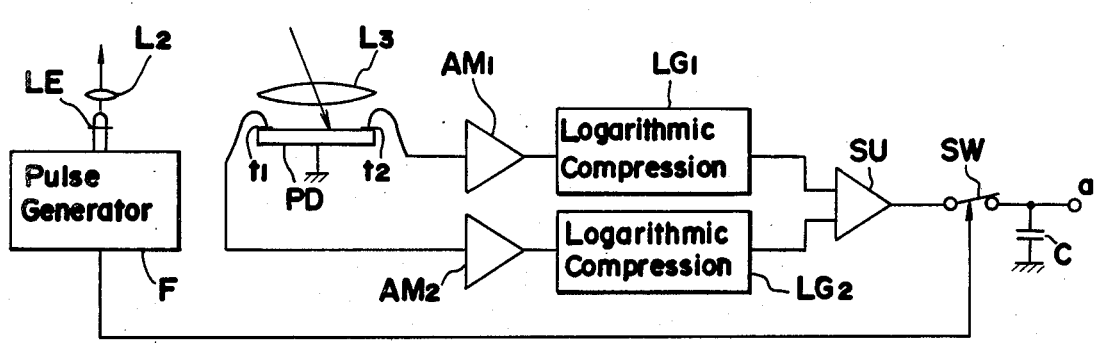
FIGS. 2 and 3 are circuit diagrams respectively showing exemplary circuits of blocks 2 and 3 in FIG. 1.

With reference to FIG. 2, pulse generator or oscillator F generates output signals at proper intervals which drive light emitting element LE. The light emitted from light emitting element LE is converged by lens L2 into a narrow beam and directed to an object to be photographed which reflects the light. The light reflected from the object is focused by lens L3 on light detector PD on which terminals t1 and t2 are disposed. Terminal t1 is located at or near a point where light reflected from an object at a distance that may be considered as optically infinite is focused. Terminal t2 is located at or near the point where light reflected from an object at the shortest available distance is focused. The focusing position of the incident light changes between terminals t1 and t2 in accordance with the camera-to-object distance. Thus, the ratio of currents obtained through terminals t1 and t2 represents the camera-to-object distance. The ratio is obtained in the FIG. 2 circuit by the subtraction of the logarithms of the currents. In FIG. 2, amplifiers AM1 and AM2 amplify respectively the currents from light detector PD. Logarithmic compressors LG1 and LG2 generate outputs respectively proportional to the logarithms of the amplified currents. Subtractor SU generates an output as a function of the difference between the outputs of logarithmic compressors LG1 and LG2. The output of subtractor SU is supplied through switch element SW to capacitor C to charge the latter. Switch element SW is controlled by the output of pulse generator F so that it is conductive only while light emitting element LE is emitting light. Thus, capacitor C always stores the information of the last mentioned camera-to-object distance in the form of an analog signal. The details of this range finding device may be found in a copending U.S. patent application of Matsuda et al. (Ser. No. 362,033) field on Mar. 25, 1982 with the title "DISTANCE MEASURING DEVICE" and assigned to the same assignee.

Returning to FIG. 1, distance signal a from distance measuring device 2 is compared, by comparators AC1 and AC2, with the voltage signals corresponding to the instantaneous advanced position of objective lens L1. Resistors R1 through R8 are connected in series with each other to constant current source IS and have their nodes respectively connected with fixed contacts T1 through T8 along which brushes B1 and B2 slidingly move. The resistances of resistors R1 through R8 are determined so that the voltage at the fixed contact corresponding to the position of objective lens L1 is equal to the distance signal produced by distance measuring device 2 for an object at one of the discrete distances to be focused by the objective lens at that position. Brushes B1 and B2 are arranged to engage adjoining fixed contacts. In the embodiment, objective lens L1 moves in the direction to focus on a nearer object as brushes B1 and B2 move towards fixed contact T8, while objective lens L1 moves towards the infinity focused position. Assuming that distance measuring device 2 generates a distance signal a having a voltage between the voltages at fixed contacts T4 and T5 and that movable member 1 assumes the position shown in FIG. 1, the voltages picked up by brushes B1 and B2 are both lower than the distance signal a since brushes B1 and B2 respectively engage fixed contacts T2 and T3. Accordingly, output d of comparator AC1 is a "Low" level since the voltage at the negative input terminal of the comparator is higher than the voltage at the positive input terminal of the same. Comparator AC2 generates a "High" level as output e since its positive input terminal receives higher voltage than its negative input terminal. Then, if brushes B1 and B2 engage fixed contacts T4 and T5, the distance signal a is a voltage between the voltages at fixed contacts T4 and T5 so that the positive input terminal of comparator AC1 becomes a "High" level to make output d a high level, while output e of comparator AC2 is also a "High" level since the input to the positive input terminal of comparator AC2 is higher than that of the negative input terminal of the same. When brushes B1 and B2 move further towards resistor R8 i.e. farther distance focused position, output d of comparator AC1 is a "High" level while output e of comparator AC2 becomes a "Low" level. The relationship between the outputs of comparators AC1 and AC2 and the position of brushes B1 and B2, i.e. the focusing position of the objective lens, is shown in the following Table.

TABLE

| Position of the Objective Lens | AC1 | AC2 |
|---|---|---|
| Nearer Focused Position | Low | High |
| In-focus Position | High | High |
| Farther Focused Position | High | Low |

The outputs of comparators AC1 and AC2 are supplied through D-flip-flops DF1 and DF2 to motor drive circuit 3.

Figure 3:
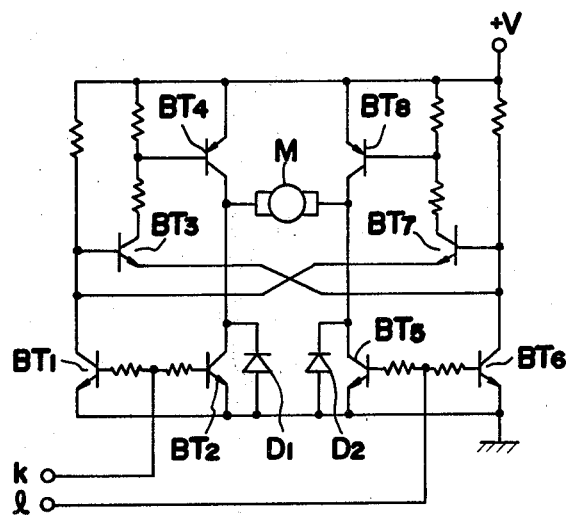

The operation of the motor drive circuit will be explained with reference to FIG. 3. When input k (see FIG. 3) is a "Low" level and input l is a "High" level transistors BT5, BT6, BT3 and BT4 are conductive and transistors BT1, BT2, BT7 and BT8 are non-conductive, whereby the current flows from power source +V through transistor BT4, motor M and transistor BT5 to energize motor M. In this case, as the input k is a "Low" level and input l is a "High" level showing that the objective lens is at a position to focus on an object at a nearer distance than that of the target object, objective lens 1 and movable member 1 are shifted by motor M in a direction where the distance on which the objective lens focuses becomes larger. When the objective lens 1 is at a position to be focused on an object farther than the target object, input k is a "High" level and input l is a "Low" level, making transistors BT1, BT2, BT7 and BT8 conductive so that motor M is driven in the opposite direction to shift objective lens L1 amd movable member 1 in a direction where the distance on which the objective lens focuses become shorter. When the objective lens is at a position to focus on the target object, both inputs k and l are "High" levels which cause transistors BT2, BT5, BT1 and BT6 to be conductive and transistors BT3, BT4, BT7 and BT8 non-conductive to stop motor M. It can be understood that when inputs k and l are both "High" levels, transistor BT2 and BT5 are conductive to short-circuit across motor M, which is braked and stops abruptly.

Figure 4:
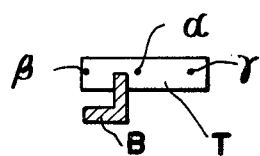
FIG. 4 is an explanatory illustration showing the contract position of brush B relative to fixed terminal T.

When considering the situation where the objective lens has been stopped, it will be seen in FIG. 4 that the electric condition does not change at whatever the position from point β to point γ. Brush B (representing brush B1 or B2) is in contact with fixed contact T (representing any one of fixed contacts T1 through T8). However, assuming that objective lens 1 is optically best focused on the target object with brush B engaging fixed contact T at point γ, an error of approximately 1 step will occur in the case when brush B engages fixed contact T at point β. If objective lens L1 is arranged to be stopped at any time with brush B engaging fixed contact T at the central point α, the above mentioned error will be reduced by half and will be ½ step at the maximum. In short, if the objective lens control mechanism described above is arranged so that motor M always stops with brush B at the center of fixed contact T, it is unlikely that objective lens 1 will be stopped at a position significantly deviating from its optically best focus position. Brush 3 and index terminals J1 through J8 are provided as a measure to attain that purpose.

Terminals J1 through J8 are positioned so that brush B3 engages one of the terminals when brushes B1 and B2 are at the centers of adjoining ones of fixed contacts T1 through T8. Terminals J1 through J8 are connected to the positive terminal of power source +V, while brush B3 is connected to pulse generator OS1 such as a one-shot circuit. Accordingly, when brushes B1 and B2 reach the centers of adjoining ones of fixed contacts T1 through T8, brush B3 comes into contact with either one of terminals J1 through to J8 to trigger pulse generator OS1 for causing the same to produce a pulse at point f. The pulse is supplied through OR gate OR1 to clock input terminals CL of D-flip-flops DF1 and DF2, which in turn transmit their inputs at the time of pulse reception, i.e. the outputs of comparators AC1 and AC2 at that time, to motor drive circuit 3 as its inputs. Thus, D-flip-flops DF1 and DF2 constitute a memorizing means for memorizing the comparison results by comparators AC1 and AC2 in response to the pulse from trigger pulse generator OS1. As described above, when distance signal a has a level between the voltages at fixed contacts T4 and T5, the outputs of comparators AC1 and AC2 are both "High" levels. However, those outputs are transmitted to motor drive circuit 3 to stop motor M only when brush B3 comes into contact with terminal J3. That is, the objective lens is stopped only when brush B3 engages any one of terminals J1 through J8.

Next, a description will be given concerning the case when the distance signal changes for any reason, with objective lens L1 having been stopped. When objective lens L1 has been stopped, motor M is at a stop condition so that the outputs of D-flip-flop DF1 and DF2 are both "High" levels. Accordingly, the output of AND gate AN1 is a "High" level. When distance signal a changes at this state, the outputs of comparators AC1 and AC2 change from both "High" levels to "High" and "Low" or "Low" and "High" levels. Then, the output of exclusive OR gate EO1 becomes a "High" level with the output of AND gate AN1 being a "High" level as described above, so that the output of AND gate AN2 becomes a "High" level so as to trigger pulse generator OS2 such as a one-shot circuit. The output of pulse generator OS2 is supplied through OR gate OR1 to clock input terminals CL of D-flip-flops DF1 and DF2 which transmit the outputs of comparators AC1 and AC2 at the time of pulse reception, to motor drive circuit 3 and actuate motor M. Motor M is driven until objective lens L1 again reaches a position to focus on a target object, and is stopped when brush B3 comes into contact with any one of terminals J1 through J8.

It is to be understood that index terminals J1 and J8 need not necessarily be disposed adjacent to fixed contacts T1 through T8, but may be provided on any rotary member movable in response to the movement of movable member 1 so that a slider contact corresponding to brush B3 relatively slides over the terminals.

The present invention has been described with reference to FIGS. 1 to 4 in connection with an embodiment applied to an objective lens driving mechanism for a camera automatic focusing device. The present invention may also apply to an automatic adjusting or control device for an objective lens diaphragm. In this case, block 2 of FIG. 1 is substituted by a light measuring and exposure calculation circuit which produces at terminal a an analog signal corresponding to a diaphragm aperture value to be adjusted, while motor M may be arranged to drive the diaphragm and movable member 1 may be arranged to move in response to the change of the diaphragm aperture.

According to the present invention as described above, a movable member is stopped when two signals corresponding to the position of the movable member sandwich a signal for a target position at which the movable member is to be stopped, whereby the hunting phenomenon will not occur. Additionally, error regarding the stop position of the movable member will be reduced if the device of the invention is arranged so that the movable member is stopped in accordance with the comparison of the signal for the target position with the above-mentioned two signals when the movable member reaches a particular position in any one of the continuously dividing ranges. Further, the wear of a resistor which changes the resistance and lowers the accuracy of the position control will not occur if the means for converting the position of the movable member to an analog signal is arranged so that the intermediate taps are derived from a resistor and respectively connected with fixed contacts over which movable contacts slidably move in response to the movement of the movable member.

While a preferred embodiment has been described, variations thereto will occur to those skilled in the art within the scope of the present inventive concepts which are delineated by the following claims.

What is claimed is:

1. A position control device comprising:
    a movable member movable along a predetermined path;
    means for moving said movable member;
    signal generating means for generating a first analog signal corresponding to a target position where said movable member is to be stopped;
    position conversion means for converting the position of said movable member into second and third analog signals being discrete from one another and corresponding to the position of said movable member; and
    control means for comparing said second and third analog signals with said first signal for control of said moving means, said control means generating a stop signal for stopping said moving means when said movable member is driven to a position where said second and third analog signals sandwich said first analog signal.

2. A position control device as defined in claim 1, wherein said control means includes:
    means for generating a pulse each time said movable member passes one of a number of predetermined points set with a given interval along the path of the movement of said movable member; and
    means connected to said pulse generating means for memorizing the result of the comparison between said first analog signal and said second and third analog signals in response to the pulse from said pulse generating means to generate an output corresponding to the memorized comparison result, said moving means being responsive to the output of said memorizing means and adapted to stop its operation when the memorized comparison result indicates that said second and third analog signal sandwich said first analog signal.

3. A position control device as defined in claim 2, wherein said position conversion means includes:
    a constant current source;

a series connection of resistors connected with said constant current source such that discrete voltage signals appear at the nodes between the adjoining two resistors in said series;

fixed electric contacts spaced in a row at a given distance and each connected to the node between the different adjoining two resistors in said series;

first and second movable contacts interlocked with said movable member to slidingly move relative to said fixed electric contacts and spaced from one another in the direction of their movements by a distance substantially equal to the spaced distance of said fixed electric contacts, whereby said first movable contacts contact one of said electric contacts when said second movable contact contacts one of said fixed electric contacts adjoining said fixed electric contact contacted by said first movable contact, so that discrete voltage signals are generated through said first and second movable contacts as said second and third analog signals.

4. A position control device as defined in claim 3, wherein said control means further includes:
   a first comparator having a positive input terminal connected to said first movable contact and a negative input terminal connected to said signal generating means; and
   a second comparator having a positive input terminal connected to said signal generating means and a negative input terminal connected to said second movable contact;
   whereby said first and second comparators generate the same output states when said second and third analog signal sandwich said first analog signal.

5. A position control device as defined in claim 4, wherein said memorizing means includes a pair of D-flip-flops one of which has a data input terminal connected to said first comparator and a clock input terminal connected to said pulse generating means and the other of which has a data input terminal connected to said second comparator and a clock input terminal connected to said pulse generating means, whereby the combination of the outputs of said D-flip-flops is the output of said memorizing means.

6. A position control device as defined in claim 2, wherein said pulse generating means includes:
   fixed index terminals arranged in a row with an interval substantially equal to the distance between said electric contacts;
   a third movable contact interlocked with said movable member to slidingly move relative to said index terminals, the arrangement of said index terminals being such that said third movable contact contacts one of said index terminals when said first and second movable contacts contact the centers of the adjoining two of said fixed electric contacts; and
   a pulse generator for generating a pulse each time said third movable contact contacts one of said index terminals.

7. A position control device as defined in claim 2, wherein said control means further includes:
   means for detecting the deviation of the comparison result between said first analog signal and said second and third analog signals after the stoppage of the operation of said driving means from the memorized comparison result memorized in said memorizing means, the deviation occurring when said first analog signal varies after the stoppage of the operation of said driving means; and
   a pulse generator for generating a pulse upon detection of the deviation by said detecting means, said memorizing means being also connected to said pulse generator so as to memorize the comparison result between said first analog signal and said second and third analog signals at the time of the generation of the pulse by said pulse generator.

8. A position control device as defined in claim 1, wherein said signal generating means includes a distance measuring device which generates a distance signal as said first analog signal, and wherein said movable member is a camera objective lens so that said driving means serves for automatic focus adjustment of said camera objective lens.

* * * * *